United States Patent [19]

Ewing

[11] Patent Number: 4,492,500
[45] Date of Patent: Jan. 8, 1985

[54] TORQUE LIMITING SET SCREW

[76] Inventor: Peter D. Ewing, 7011 Biscayne, Milford, Mich. 48042

[21] Appl. No.: 465,672

[22] Filed: Feb. 10, 1983

[51] Int. Cl.³ .................. F16B 31/02; F16B 35/00
[52] U.S. Cl. .......................... 411/5; 411/393; 411/402; 411/410
[58] Field of Search ....................... 411/1–8, 411/410, 389, 402, 393, 378

[56] References Cited

U.S. PATENT DOCUMENTS

| | | | |
|---|---|---|---|
| 2,778,265 | 1/1957 | Brown | 411/393 |
| 2,855,609 | 10/1958 | Moore | 411/393 |
| 3,027,796 | 4/1962 | Shewmon | 411/3 |
| 3,333,555 | 8/1967 | Kapnek | 411/389 |
| 3,561,317 | 2/1971 | Rowell | 411/5 |
| 3,812,757 | 5/1974 | Reiland | 411/5 |

FOREIGN PATENT DOCUMENTS 84780  12/1954  Norway ................ 411/393

Primary Examiner—Thomas J. Holko
Assistant Examiner—Neill Wilson
Attorney, Agent, or Firm—Reising, Ethington, Barnard, Perry & Milton

[57] ABSTRACT

A torque limiting set screw is disclosed with a driving head at one end and a seating head at the other end. The driving head is connected with a threaded shank by a torque control neck. The seating head comprises a disk having a seating surface with a point extending from the surface for indentation into a member to be retained. The seating surface is of larger area than the cross-sectional area of the shank and is adapted to seat against the member after the point is fully indented. The large area surface engagement by the seating head distributes the force of the set screw on the member and prevents damage to the member.

5 Claims, 6 Drawing Figures

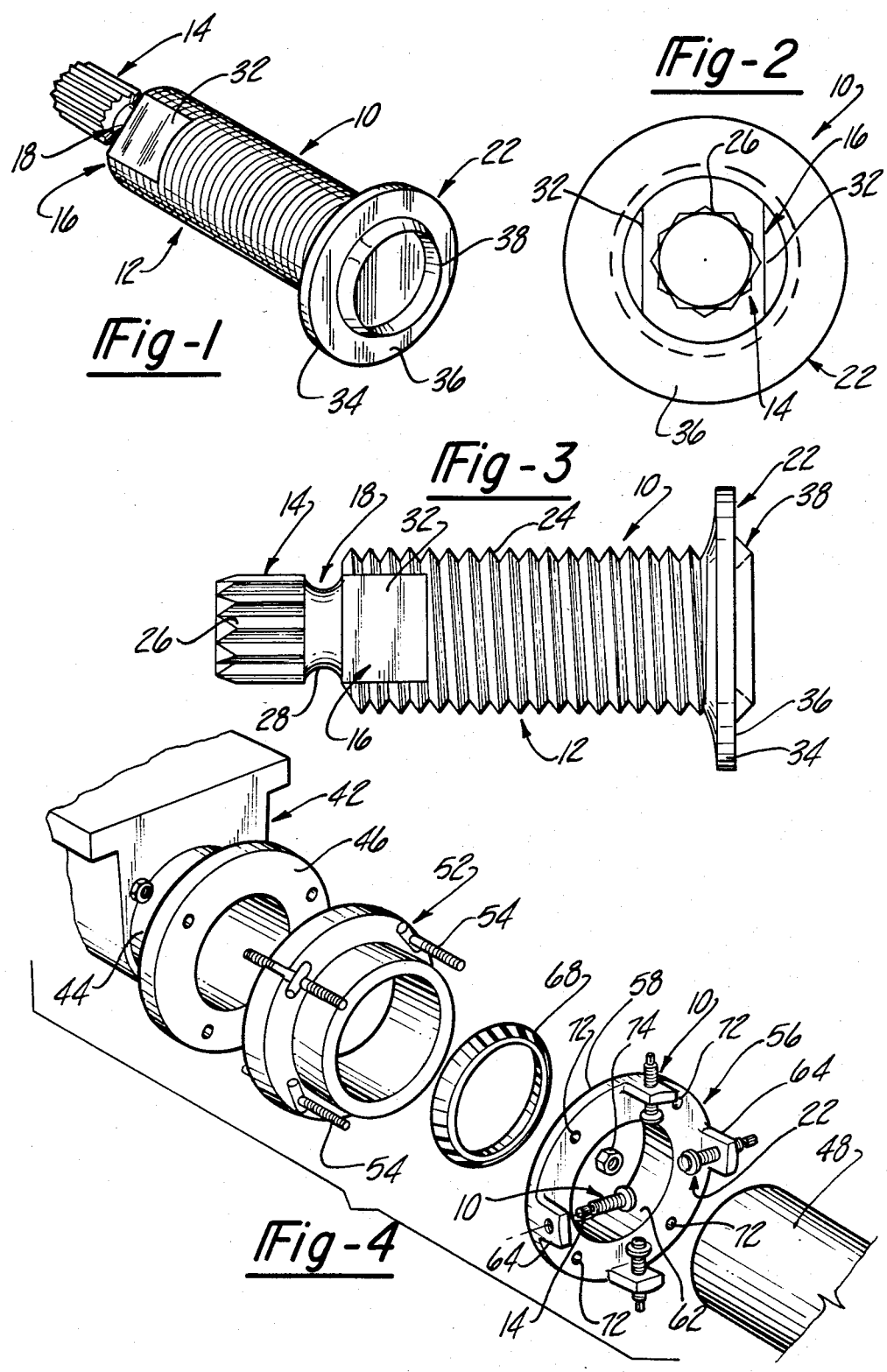

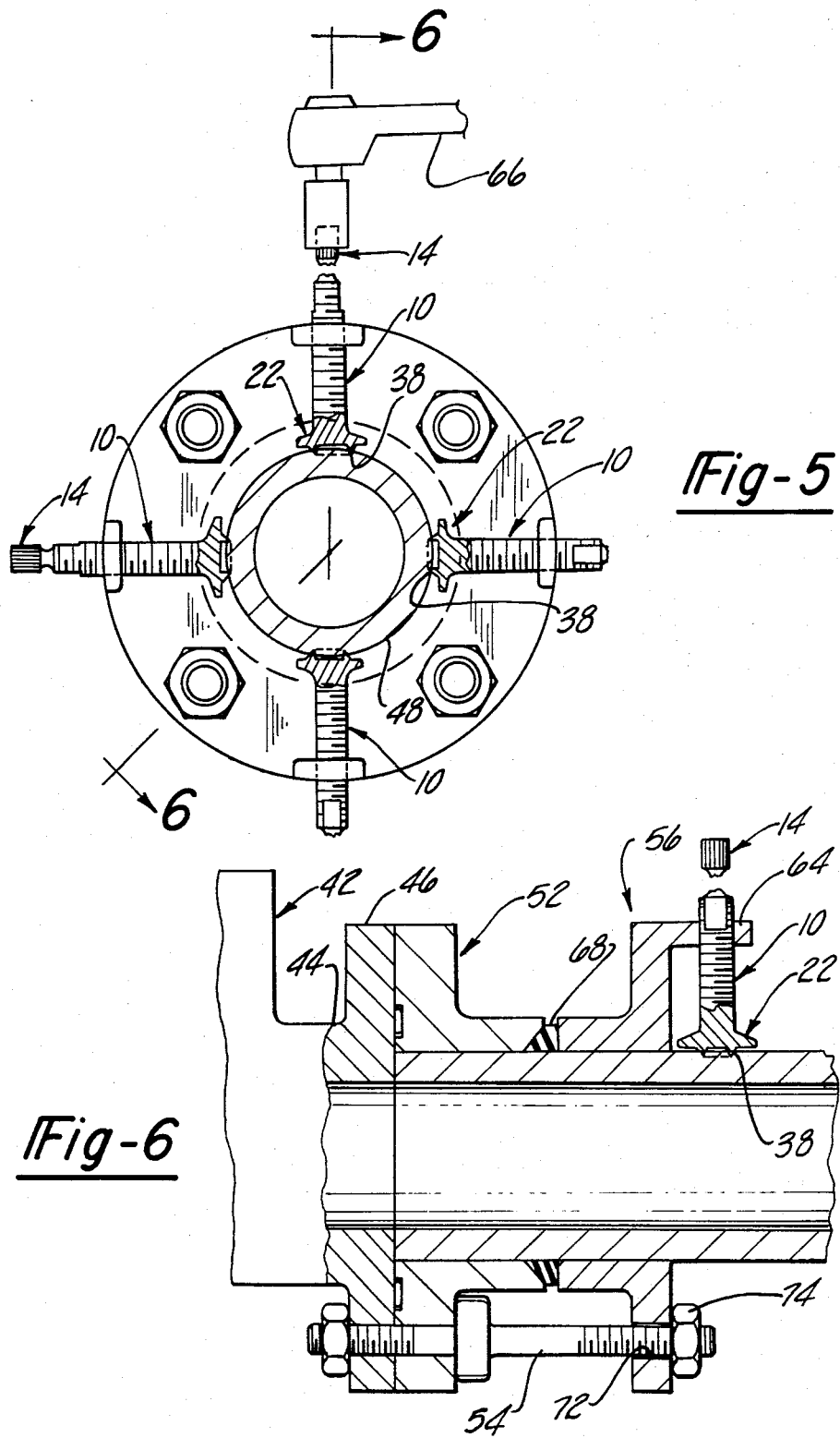

TORQUE LIMITING SET SCREW

FIELD OF THE INVENTION

This invention relates to threaded fasteners and more particularly, it relates to torque limiting set screws of the type in which the driving head is twisted off when a predetermined value of torque is applied.

BACKGROUND OF THE INVENTION

In certain applications of set screws, overtightening is likely to result in damage to one or more of the parts involved. For example, in pipe couplings in which the set screw extends through a collar and seats against a pipe, excessive torque on the set screw may deform or crush the pipe wall. In some installations this will damage the joint and cause leakage. This is a common problem in many different kinds of pipe installations, such as those used in water works in which large metal pipes are joined to various fittings by flanged couplings.

In order to obtain the desired holding force without causing damage to the joint, the practice has been to tighten the set screw to a specified torque. This has been done by using torque limiting set screws of the type having a driving head which will shear off at a predetermined torque. In order to enhance the holding force, the set screw is commonly provided with a cone point or a cup point to indent the surface of the pipe and hold it against movement. The use of a torque limiting set screw as described is not always effective to prevent damage to the joint because over-tightening may still occur under some conditions. Accordingly, there is a need for a set screw which cannot be over-tightened to the point that it damages the part on which it is seated.

Various types of torque limiting fasteners are known in the prior art. In British Patent No. 898,026 (1959) a torque limiting bolt is disclosed comprising a threaded shank and first and second driving heads at one end of the shank. The heads are joined by a torque limiting neck which has a torsional strength less than the other parts of the bolt so that the outer head twists off when a predetermined torque is applied to it. The other head remains for unscrewing the bolt. The Reiland U.S. Pat. No. 3,812,757 discloses a torque limiting fastener with a threaded shank and primary and secondary driving heads. The primary driving head is formed as a socket and the wall of the socket is dimensioned so that it has a predetermined breaking strength. In the Schuster et al U.S. Pat. No. 3,498,174 primary and secondary driving heads are provided and the neck between the heads is the torque limiting structure.

The prior art discloses pipe couplings wherein a retaining collar is mounted on a pipe end by set screws extending through the collar and seated on the pipe. The pipe is joined to a flanged fitting by an adaptor body which mounts on the flange of the fitting. The collar is then bolted to the adaptor body with suitable gasketing to provide a fluid tight joint.

In the Piatek et al U.S. Pat. No. 4,165,892 a pipe coupling is disclosed in which a bushing receives a pipe end which is clamped in position by means of a locking pin. The locking pin comprises a stem with a camming head on the inner end and a pipe engaging point on the head. The locking pin extends through the wall of the bushing and is rotatable therein by a tool engaging head on the outer end. When the pin is rotated from its unlocked position, the camming head engages the bushing and is thrust inwardly toward the pipe. The pipe engaging point bites into and grips the pipe to hold it against movement.

A general object of this invention is to provide a set screw which overcomes certain disadvantages of the prior art.

SUMMARY OF THE INVENTION

In accordance with this invention, a set screw is provided in which the tightening head of the screw twists off after it is tightened to obtain adequate gripping engagement with a member on which it is seated but before excessive pressure is applied to the member. This is accomplished by a torque limiting set screw having a tightening head at one end of a threaded shank and a seating head at the other end of the shank. The seating head has a seating surface of sufficient area to ensure that the torque limit of the set screw is reached without excessive pressure on the member.

Further, according to the invention, the set screw is of the type having a unitary body with a threaded shank with a tightening head at one end of the shank. The tightening head is joined with the shank by a torque control neck having a torsional breaking strength less than the other portions of the body. The major transverse dimension of the tightening head is no longer than the major diameter of the threaded shank. A seating head is provided at the other end of the shank and has an axial seating face with a surface area larger than the cross-sectional area of the shank. The seating face is provided with a point member to be retained when the set screw is tightened. The breaking strength of the torque control neck is great enough to permit sufficient tightening of the set screw to cause the point to indent the member until the seating face engages the member. The breaking strength of the torque control neck is small enough so that continued tightening of set screw after the seating face engages the member will cause the tightening head to break off. Preferably, a secondary or loosening head is provided below the torque control neck to permit removal of the set screw.

A more complete understanding of this invention may be obtained from the detailed description that follows taken with the accompanying drawings.

DESCRIPTION OF THE DRAWINGS

FIG. 1 is a perspective view of the set screw of this invention;

FIG. 2 is an end view of the set screw;

FIG. 4 is an exploded view of a typical pipe coupling which the set screw of this invention is used;

FIG. 5 is a view showing set screws of this invention as used in the coupling of FIG. 4; and FIG. 6 is an elevation view, partially in section showing the assembled coupling of FIG. 4.

BEST MODE FOR CARRYING OUT THE INVENTION

Referring now to the drawings, there is shown an illustrative embodiment of the invention in a particular set screw especially adapted for use in a flanged-type pipe coupling. It will be appreciated, as the description proceeds, that the invention may be used in set screws of other configurations for various applications.

The set screw 10 of this invention will be described with reference to FIGS. 1, 2 and 3. The set screw 10 comprises, in general, a unitary metal body having a threaded shank 12 and a primary driving head 14 for tightening the screw. It also comprises a secondary driving head 16 for loosening the screw. The primary head 14 and secondary head 16 are joined by a torque control neck 18 which transmits torque from the primary head to the shank. The other end of the set screw is provided with a seating head 22 for engagement with a member which is to be retained by the set screw.

The shank 12 is provided with standard screw threads 24, preferably by roll-forming. The screw threads extend from the torque control neck 18 to the seating head 22. The primary head 14 is suitably a standard twelve-point head adapted to receive a conventional socket wrench as a torque applying tool. The external surface of the head 14 is provided with multiple external flats or facets 26 for engagement by a torque applying socket for tightening the set screw. The twelve-point head is sufficiently close to being round that it can be held in roll-forming dies for forming the torque control neck 18.

The torque control neck is of circular cross-section and has a cross-sectional area which is less than the cross-sectional area of the primary driving head 14 and of the shank 12. The neck 18 is of non-uniform diameter with the minimum diameter being approximately midway between the adjacent ends of the driving head 14 and the shank 12. The neck 18 defines an annular torque control groove 28 which, in cross-section, is substantially circular but it could be of other shapes. The neck 18 is constructed of a roll-formed portion of the unitary body and it has a torsional breaking strength less than that of the shank 12 and less than that of the primary driving head 14.

The secondary head 16 comprises a pair of flats or facets 32 at diametrically opposite locations on the upper end of the shank 12. The pair of facets 32 are adapted to receive a torque applying tool for loosening and removing the set screw.

The seating head 22 comprises a circular disk 34 having a diameter substantially larger than the major diameter of the threaded shank 12. The disk 34 has a flat, axially facing, seating surface 36. The set screw is provided with a so-called "point" 38 on the seating surface 36, i.e. an indenting tip on the set screw of conventional configuration. The point 38 is in the form of the well known cup-point and is of annular configuration. It has a triangular cross-section and terminates in a knife-edge for indenting the member retained by the set screw. The set screw may be provided with other point configurations as desired.

The set screw has a predetermined torque limiting value determined by the torsional breaking strength of the torque control neck 18. When the set screw is put into use, it is tightened to the predetermined torque limiting value by applying sufficient driving torque to the driving head 14 to cause the neck 18 to fail in shear, i.e. until the driving head is twisted off. If it is desired to loosen or remove the set screw, the secondary head 16 is used. The torque limiting value is great enough so that the point 38 will indent the member being retained by the set screw before the driving head 14 is twisted off. Preferably, the entire point, from knife-edge to base, is substantially entirely indented into the member for developing the greatest gripping strength on the member. The force exerted on the member by indentation of the point will not damage the member. Upon complete indentation of the point 34, the seating face 36 comes into engagement with the member the force applied by the set screw is distributed on the member over a large area of the seating surface 36. Thus, the set screw cannot be further advanced toward the member without a substantial increase in torque. When the torque exceeds the predetermined limiting value, the driving head 14 is twisted off. Thus, the breaking strength of the torque control neck is small enough so that the continued tightening of the set screw after the seating face 36 engages the member causes the driving head to be twisted off. The force exerted by the set screw is distributed by the seating head 22 over a sufficiently large area of surface 36 so that the member will not be damaged.

The set screw 10 is preferably made from a cylindrical steel rod by a sequence of cold-forming and roll-forming operations. The cylindrical rod is upset or cold-headed to produce an intermediate blank having a shank portion of uniform diameter, a driving head portion of reduced diameter and a seating head portion of enlarged diameter. The seating head is suitably formed to its final configuration by a cold-heading operation. Also, the driving head 14 is formed to its final configuration by a cold-heading operation. The threads of the shank are roll-formed and the torque control neck 18 is roll-formed. Finally, the driving head 16 is suitably formed by a cold-forming operation after the threads are rolled.

Referring now to FIGS. 4, 5 and 6, a typical use of the set screw of this invention is shown in a conventional pipe coupling. FIG. 4 is an exploded view of a flanged pipe coupling. It comprises a pipe fitting 42, such as a valve body, having a conduit 44 terminating in a coupling flange 46. The pipe 48 is to be coupled in fluid tight relation with the conduit 44. For this purpose, an adaptor body 52 is mounted in fluid tight connection with the coupling flange 46 by a set of cross-bolts 54. Each cross-bolt has a double-ended threaded shank with an intermediate cross-head seated on the flange of the adaptor body. One shank of each cross-bolt extends through a mating opening in the flange 46 and the adaptor body is secured to the flange 46 by nuts on the cross-bolts.

A follower ring or collar 56 is adapted to be mounted on the end of the pipe 48. Collar 56 comprises an annular ring 58 which defines a central opening 62 adapted to receive the end of pipe 48. The ring 58 is provided with a set of four set screw brackets 64 which extend axially from the ring 58. Each bracket includes a radially extending tapped hole adapted to receive the threaded shank of the set screw 10. Before the collar 56 is disposed upon the pipe 48, a set screw 10 is threaded into each of the brackets 64. It is noted that the set screw 10 is inserted head-first from the inside of the bracket 64, the driving head 14 being small enough to pass through the tapped hole in the bracket. The shank of the set screw is threadedly engaged with the tapped hole and screwed through the bracket far enough so that the seating head 22 of the set screw is disposed radially outwardly of the central opening 62 whereby the collar 56 may be freely slipped onto the end of pipe 48.

With the collar 56 in place on the end of pipe 48, the set screws 10 are sequentially tightened, as indicated in FIG. 5 by a wrench 66. It is noted that each set screw is tightened until its point 38 is fully indented into the pipe 48 and the flat seating surface 36 is seated against the pipe. With the seating surface 36 engaging the pipe, further torque applied to the driving head 14 causes the head to twist off before excessive force is applied to the pipe. The full indentation of the points 38 of the set screws 10 ensure that the pipe 48 is adequately gripped by the set screws and retained against axial movement. The coupling is completed by placing a gasket 68 over the end of the pipe 48 and inserting the end of the pipe 48 into the adaptor ring 52. The free ends of the cross-bolts 54 extend through the mating openings 72 in the ring 58 of the collar 56 and the nuts 74 are tightened to draw the collar 56 toward the adaptor ring 52 until the fluid tight seal is obtained at gasket 68.

Although the description of this invention has been given with reference to a particular embodiment, it is not to be construed in the limiting sense. Many variations and modifications will now occur to those skilled in the art. For a definition of the invention, reference is made to the appended claims.

What is claimed is:

1. A torque limiting set screw of the type comprising a unitary body including a threaded shank and a tightening head at one end of the shank,
   the tightening head being adapted to be engaged by a torque applying tool for tightening the set screw,
   the tightening head being joined with the shank by a torque control neck having a torsional breaking strength less than the other portions of said body,
   the improvement including:
   the major transverse dimension of said tightening head being no greater than the diameter of said shank,
   a seating head at the other end of said shank and having an axial seating surface with a surface area larger than the cross-sectional area of said shank,
   a point extending from the seating surface for engaging a member to be retained when the set screw is tightened,
   the breaking strength of said torque control neck being great enough to permit sufficient tightening of the set screw to cause indentation of said member by the point,
   the breaking strength of the torque control neck being small enough so that continued tightening of the set screw after the seating surface engages said member will cause the tightening head to break off.

2. The invention as defined in claim 1 including a loosening head on said shank adapted for engagement by a torque applying tool for loosening the set screw.

3. The invention as defined in claim 2 wherein,
   said tightening head has external tool engaging surfaces for engagement by a torque applying tool, and
   said loosening head comprises at least two flat surfaces on said body.

4. The invention as defined in claim 3 wherein,
   said loosening head comprises two diametrically opposed flat surfaces on the threaded shank.

5. The invention as defined in claim 1 wherein,
   said point is a cup-point with triangular cross-section extending axially from said seating surface.

* * * * *